United States Patent [19]
Basso et al.

[11] Patent Number: 5,444,692
[45] Date of Patent: Aug. 22, 1995

[54] TOKEN STAR BRIDGE

[75] Inventors: Claude Basso, Nice; Jean Calvignac, La Gaude; Fabrice Verplanken, Cagnes-Sur-Mer, all of France

[73] Assignee: International Business Machines Corp., Armonk, N.Y.

[21] Appl. No.: 161,372

[22] Filed: Dec. 2, 1993

[30] Foreign Application Priority Data

Dec. 22, 1992 [EP] European Pat. Off. ............ 92480199

[51] Int. Cl.[6] .......................................... H04L 12/417
[52] U.S. Cl. ..................................... 370/13; 370/85.5; 370/85.14
[58] Field of Search ................. 370/13, 56, 85.4, 85.5, 370/85.13, 85.14; 395/500

[56] References Cited

U.S. PATENT DOCUMENTS

| | | | |
|---|---|---|---|
| 4,539,679 | 9/1985 | Bux et al. | 370/85.14 |
| 4,933,938 | 6/1990 | Sheehy | 370/85.13 |
| 5,241,540 | 8/1993 | Ocheltree | 370/85.14 |
| 5,313,618 | 5/1994 | Pawloski | 395/500 |

FOREIGN PATENT DOCUMENTS

0397188 11/1990 European Pat. Off. .
2226740 11/1990 United Kingdom .

*Primary Examiner*—Benedict V. Safourek
*Attorney, Agent, or Firm*—Jerry W. Herndon

[57] ABSTRACT

The invention includes a bridge having n ports (n>1), each port being connected to a Token-Ring physical segment, each physical segment having one native Token-Ring workstation attached. The bridge to the workstations a single Token-Ring logical segment with a single Active Monitor and a single Ring Number. The invention includes a centralized medium access control (MAC) function inside a centralized processor instead of a MAC function implemented at each port of the bridge; the frame handling function, due to the fixed and limited configuration (same bridge Active Monitor seen by all connected stations), does not require a multiport bridge function, but a simpler switch function between ports. Bridge clocking is also simplified, and a cost effective unshield twisted pair (UTP) retiming solution is presented.

6 Claims, 9 Drawing Sheets

BPP: BACK PLANE PORT
TRP: TOKEN RING PORT
TS: TOKEN STAR BLADE
FDDI: FIBER DISTRIBUTED DATA INTERFACE

FIG. 1
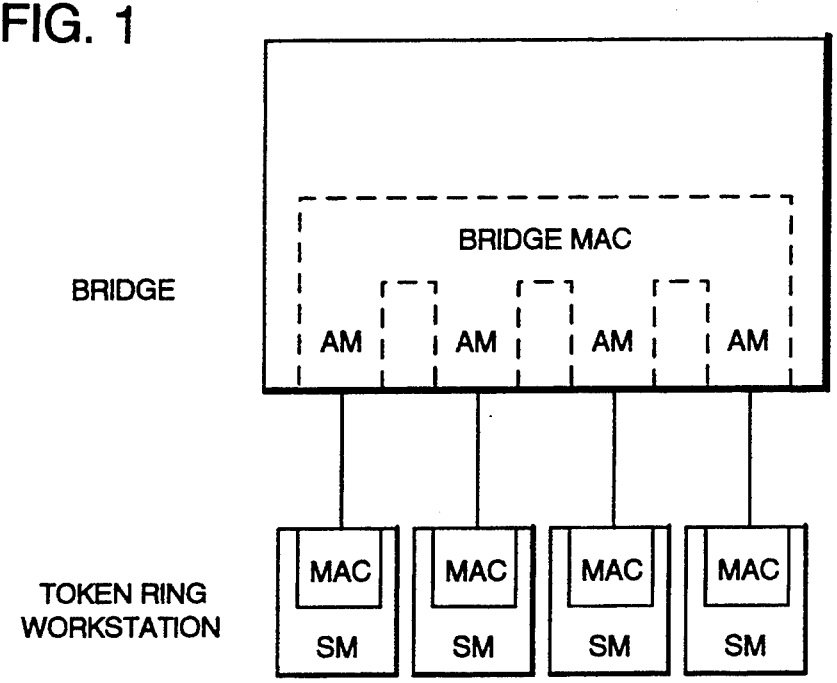
AM: ACTIVE MONITOR
SM: STANDBY MONITOR
MAC: MEDIA ACCESS CONTROL
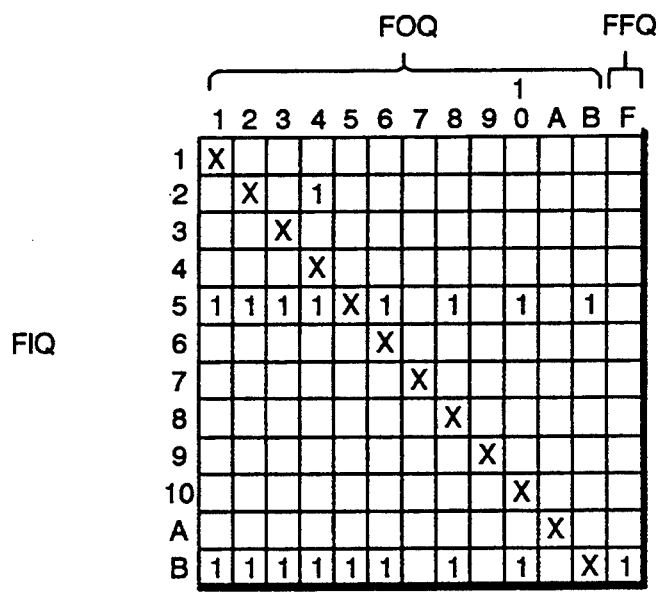
FIG. 12

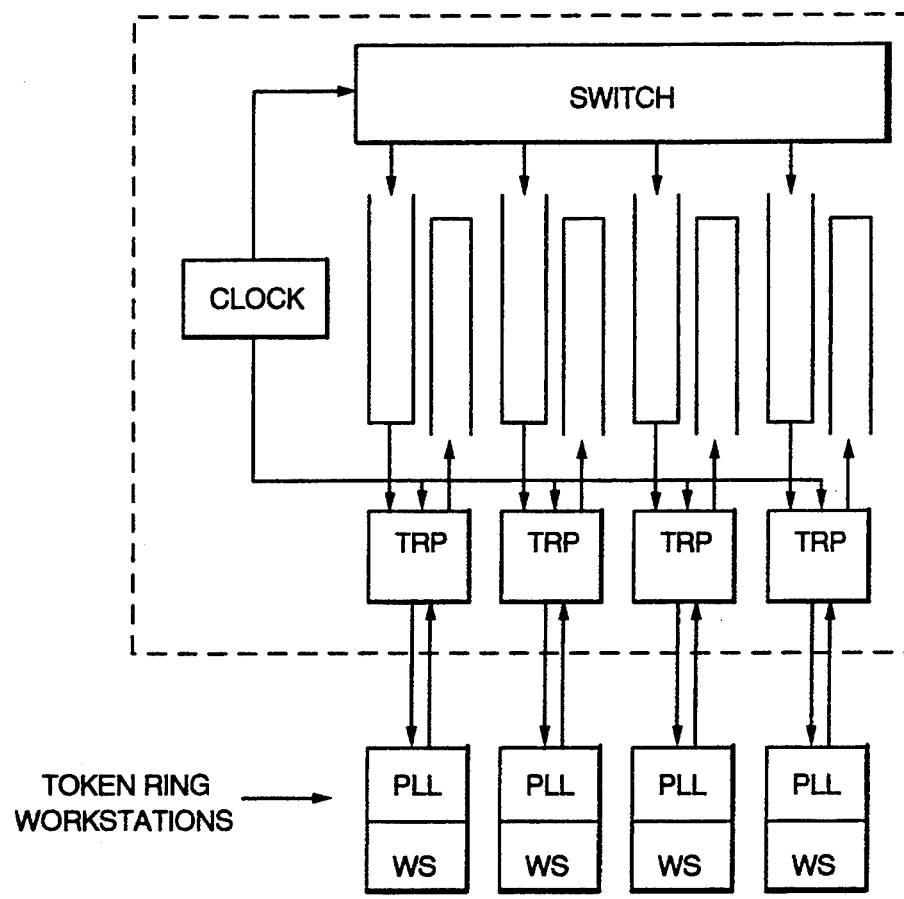
FIG. 2
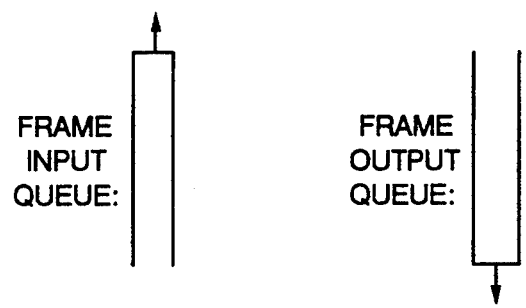
TRP: TOKEN RING PORT
PLL: PHASE LOCKED LOOP
WS: WORKSTATION BPP: BACK PLANE PORT
TRP: TOKEN RING PORT
TS: TOKEN STAR BLADE
FDDI: FIBER DISTRIBUTED
    DATA INTERFACE TRANSMITTING PORTS: 1, 2, 6, 8, AMP, BPP
RECEIVING PORTS: 3, 5, 7, 9, 10, BPP
IDLE PORTS: 4

TRANSMITTING PORTS: 1, 2, 6, 8, AMP, BPP
RECEIVING PORTS: 3, 5, 7, 9, 10, BPP
IDLE PORTS: 4
BPP: 7 READ CYCLES PER RWS,
7 WRITE CYCLES PER RWS

FIG. 15

| | | GSSA + |
|---|---|---|
| LSB | | 000 |
| STA BLADE | 1 TRP 1 | 002 |
| MSB | | 004 |
| LSB | | 006 |
| STA BLADE | 1 TRP 2 | 008 |
| MSB | | 00A |
| LSB | | 036 |
| STA BLADE | 1 TRP 10 | 038 |
| MSB | | 03A |
| LSB | | 03C |
| STA BLADE | 2 TRP 1 | 03E |
| MSB | | 040 |
| LSB | | 38A |
| STA BLADE | 15 TRP 10 | 38C |
| MSB | | 38E |
| LSB | | 390 |
| STA BLADE | 16 TRP 1 | 392 |
| MSB | | 394 |
| LSB | | 3B4 |
| STA BLADE | 16 TRP 9 | 3B6 |
| MSB | | 3B8 |
| LSB | | 3BA |
| STA BLADE | 16 TRP 10 | 3BC |
| MSB | | 3BE |

TOKEN STAR BRIDGE

The present invention relates to hub technologies in general, and more particularly to a bridge for interconnecting Token-Ring Local Area Networks.

The trend in communication industry in the last 15 years has clearly been to try and convey on the same physical media all kinds of different types of data: modems once allowed the transport of computer data on top of voice, thru the already installed telephone network, while some time later, the newly installed Integrated Services Digital Network (ISDN) was originally designed for equally transporting computer data as well as voice, with provision made for video.

End-user equipment has obviously evolved accordingly: current hardware is often ready to handle all three computer data, voice and video, and adaptation of the software is under way according to the technical publications. Workstations or personal computers nowadays already feature adaptation cards for high fidelity sound, video, mass storage with compact discs, etc... The operating systems are on the verge of being able to manage and synchronize all kinds of information data, including those (sound, moving images, etc . . .) associated with isochronous signals (i.e. signals characterized by a regular time interval).

The so-called 'Multimedia' revolution is around the corner, with its requirements of larger available bandwidth at the network/end-user interface. New telecommunication media are emerging (ex: 'broadband' ISDN) to fulfill those requirements, but slowly enough and at a significant cost, so that there is a need for an end-user to try and take advantage of the Multimedia capability on the existing networks he is connected to.

In particular thousands of Local Area Networks (LANs) interconnect end-users throughout the world. And amongst them, a great deal feature the Token-Ring architecture (IEEE 802.5 standard).

The Token-Ring architecture is well-known to persons skilled in the art, and a large number of publications deal with the subject, including, but not exclusively, 'LAN protocol' by Mark E. Miller (ISBN 1-55851-0990), 'Inside the Token-Ring' by J. Scott Haugdahl (ISBN 0-939405-00-8), 'Handbbok of computer communications' by William Stallings (ISBN 0-672-22665-00, 0-02-948071-X and 0-672-22666-9), the teaching of which will be incorporated hereafter.

The above-mentioned requirements of larger available bandwidth at the network/end-user interface, are however not fulfilled in Token-Ring LANs where all workstations attached to a segment share an at most 16 Mbps bandwidth.

To address this problem, the known solution is to limit the number of workstations attached to a single Token-Ring segment. This is the trend currently observed in many LAN implementations, the extreme being to set this limit to one attached workstation, and interconnect several single-workstation segments via multiport bridges.

This known solution yet comes with several drawbacks:
- There must be one Medium Access Control (MAC) function implemented in each port of the bridge, which makes it a very costly solution;
- The bridge has to deal with as many segments as there are workstations, which can be difficult to handle and anyway limited by the maximum number of manageable Token-Ring segments (Source Routing field currently limited to a seven segment capability);
- Today's technology does not allow such a bridge to be implemented with more than a few ports.

It is therefore an object of the present invention to overcome the above-mentioned drawbacks.

The invention includes the following features:
- All workstations are standard Token-Ring workstations;
- All workstations appear to belong to the same segment, but at the same time can take advantage of a logical star topology brought by a physical (wiring) star topology around a multi-port bridge, while all user traffic (LLC) frames are directly switched between workstations with no bandwidth limitation whatsoever other than the one (16 Mbps) induced by a single-workstation segment;
- Only one segment is managed inside the bridge, and in particular only one Active Monitor exists on this segment; in one embodiment, the Active Monitor function is provided by the bridge itself at each port, in such a way that each workstation always acts as a Standby Monitor.

The invention allows avoiding a full MAC function to be implemented in each port of such a bridge:
- The handling of several MAC frames is no longer required, as detailed further, thanks to the fact that the configuration is limited to one Standby Monitor per port and one Active Monitor on the bridge side;
- Handling of the remaining MAC frames is no longer done on each port but centralized inside one processor in the bridge (or in bridge concentration cards). To do so, all possible contention of MAC frames generated by all of the workstations is handled by serially processing one after the other, MAC frames received from each port;
- In each port is implemented a logic used to retain the token given by the workstation, for per port flow control, or when a frame (LLC or MAC) has been received and not yet forwarded;
- The Active Monitor function allows to simplify clocking and leads to a simple Unshielded Twisted Pair (UTP) solution for the physical wiring.

The invention allows to replace a MAC-per-port by a centralized function inside a centralized processor; the frame handling function, due to the fixed and limited configuration (same bridge Active Monitor seen by all connected stations), does not require a multi-port bridge function, but a simpler switch function between ports. Bridge clocking is also simplified, and a cost effective UTP retiming solution is presented.

More specifically, the invention includes a bridge having n ports (n>1), each port being connected to a Token-Ring physical segment, each physical segment having one native Token-Ring workstation attached, said bridge comprising means for emulating to the workstations a single Token-Ring logical segment with a single Active Monitor and a single Ring Number. In one embodiment of the invention, the means for emulating include means for defining the bridge as the Active Monitor by providing the same MAC address in all Active Monitor Present MAC frames sent to the workstations. In a further embodiment, the bridge comprises means for, upon reception of a frame sent by any of the workstations, handling said frame, the handling means comprising means for switching a Single Destination LLC or MAC frame to any of the n ports and attached workstations, means for broadcasting a Functional destination Address LLC or MAC frames to all of the (n-1) other ports and attached workstations, means for processing independently at each port a Token-Ring Control frame such as a Beacon, Claim Token, Ring Purge, or Duplicate Address Test MAC frame, means for emulating propagation of a Neighbor Notification MAC frame to the next port and attached workstation, and further means for yet upon reception of a frame sent by any of the workstations, delaying releasing of the Token to said workstation, until the received frame has been handled by said handling means.

The invention will be better understood from the following detailed description read in conjunction with the following drawings:

FIG. 1 being a general view of the bridge according to the invention.

FIG. 2 shows a logical representation of the bridge according to the invention.

Figure 8:
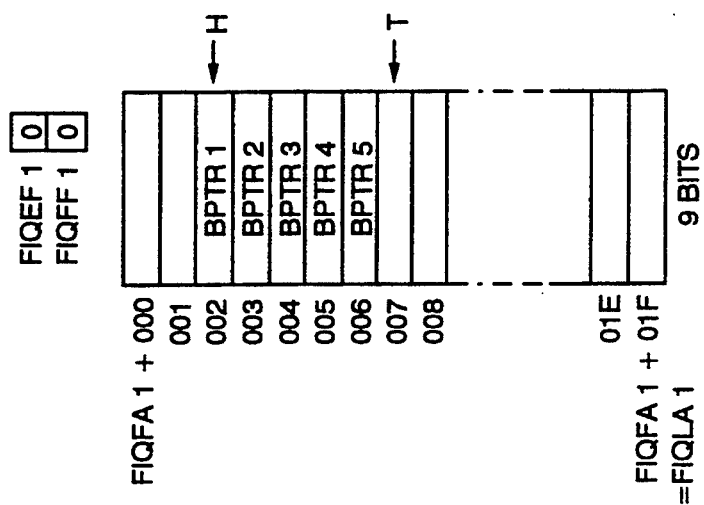

FIG. 8 details Frame Input Queues.

Figure 9:
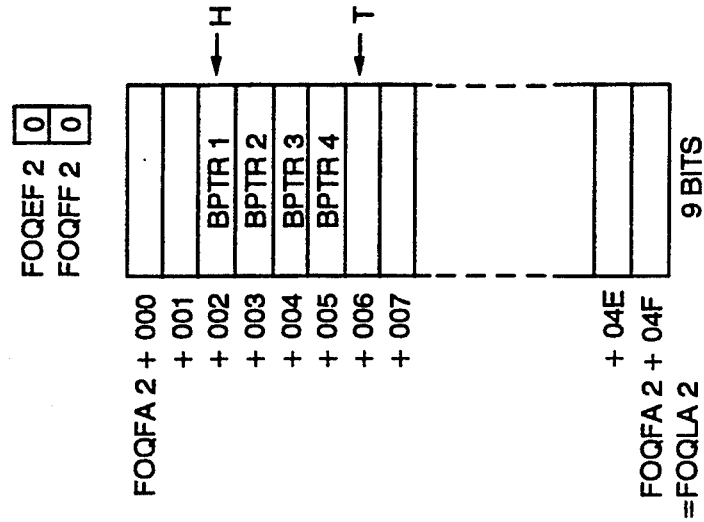

FIG. 9 details Frame Output Queues.

Figure 10:
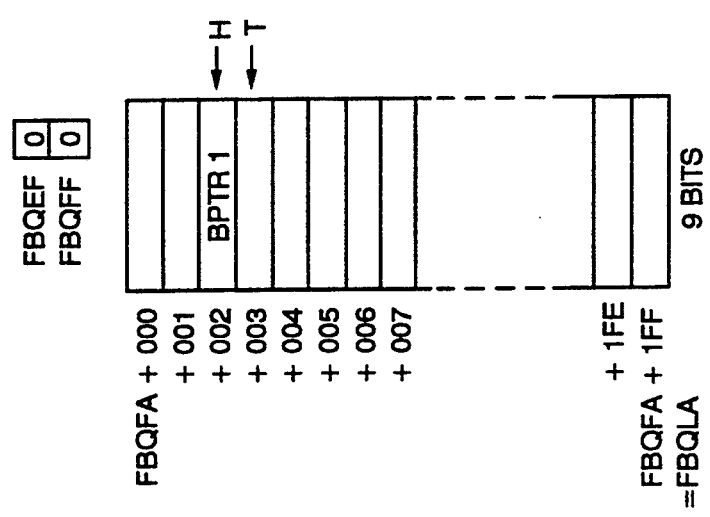

FIG. 10 details Free Buffer Queue.

Figure 11:
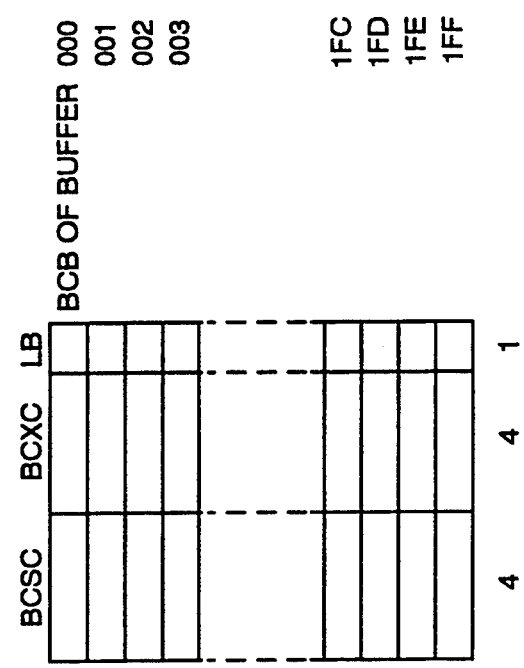

FIG. 11 details Buffer Control Blocks.

FIG. 12 details the Switch Request Table.

Figure 13:
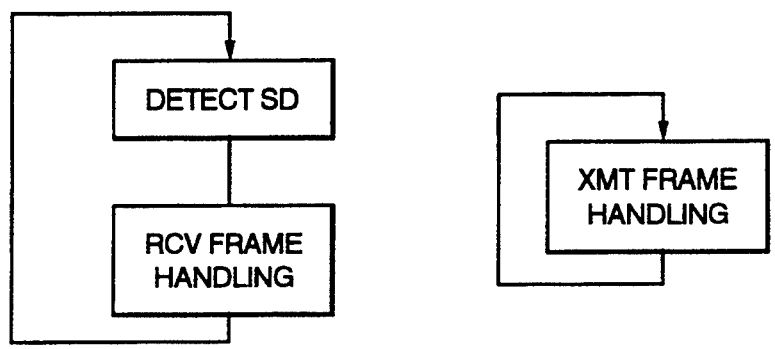

FIG. 13 is a general flowchart for the BackPlane Port.

Figure 14:
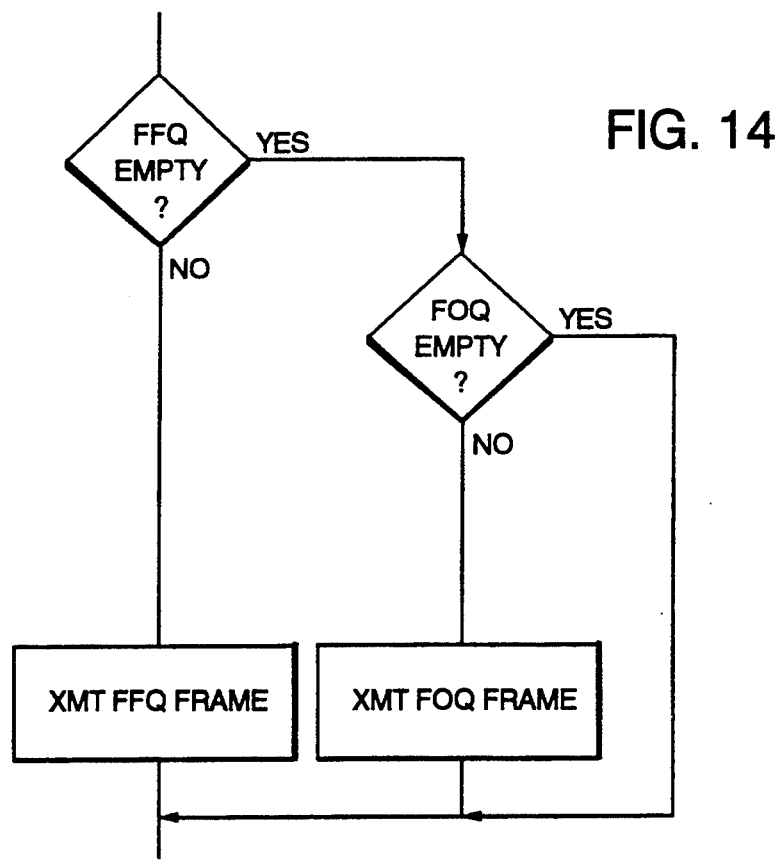

FIG. 14 is a flowchart for transmit frame handling in the BackPlane Port.

FIG. 15 details the Global Station Access Table.

FIG. 1 is a general view of the bridge according to the invention. The number of ports and attached workstations is just a mere example and should not be interpreted in any restrictive manner.

The bridge implements a segment under a star topology, at the physical and logical levels, without changing the protocol at the workstation interface. Key points of the invention are:

The bridge contains the Active Monitor for all ring segments served by the bridge;

One MAC (Medium Access Control) function is implemented in the bridge to serve all bridge ports.

Making the bridge present an Active Monitor to each workstation requires a MAC address to be associated with said bridge.

This leads to a concept of 'Shared MAC' distributed among all ports of the bridge: each workstation sees an Active Monitor as is Nearest Active Upstream Neighbor (NAUN), and the same MAC address is used to point to the Active Monitor; each workstation is then the NAUN of the Active Monitor associated to the port.

This is a deviation from the common Token-Ring structure in that description of the topology is altered. This deviation is acceptable due to the specific nature of the bridge. In turn, the modified network management aspects will be handled by the bridge.

FIG. 2 shows a logical representation of the bridge with a set of interface ports exchanging frames thru input queues, switch and output queues: The Token-Ring Ports (TRP) implement the minimal MAC acting as the Active Monitor for the attached workstation.

The Frame Input Queues (FIQ) hold frames issued by a workstation before being routed by the switch.

The Frame Output Queues (FOQ) hold frames to be issued to a workstation after switching.

The switch as shown, has therefore an aggregate throughput of maximum four times the available bandwidth at the TRP.

Making the bridge act as the Active Monitor to the attached workstations gives significant benefits in design simplicity, as appreciated by the manskilled-in-the-art:

The Neighbor Notification process is simplified in that the bridge only has to handle 'Standby Monitor Present' MAC frames issued by workstations;

Most of all, the bridge is single clocked: its on-board clock is used to run the internal logic and drive data flow to the attached workstation; in turn the attached workstation recovers the bridge clock from incoming data stream by its PLL and presents to the bridge a transmit data stream which is synchronous with the bridge clock. Phase alignment concerns are much more limited than in the case of chained PLLs; here a simple mechanism (±clock resampling) can be used, and complex and costly logic (PLLs) can be avoided. Thus, the bridge also provides a cost-effective implementation of UTP connections for Token-Ring.

In one embodiment of the invention however, the Active Monitor function is not located in the bridge, but any of the attached workstations can be this Active Monitor. Such an embodiment involves:

Full support of Token Claiming process by the bridge: since any workstation can be the Active Monitor, the full Token Claiming process must be run by letting workstations bid for the Token. This is done by letting the 'Claim Token' MAC frames be propagated from port to port. The winning workstation is the one with the highest MAC address. During this phase, the bridge must propagate the clock from upstream port to downstream port. This is because the Token Ring clock can be provided successively by different workstations.

Detection of port attaching the elected Active Monitor: once a workstation has acquired the Active Monitor status, it must be detected by the bridge. This is done by detecting which port is receiving the 'Ring Purge' MAC frames sent by the winning workstation to signal the end of Token Claiming process.

Setting of network timing on Active Monitor clock: after having identified the port attaching the Active Monitor, the bridge must propagate to all other ports the clock received on this one.

Emulation of the ring for the Active Monitor functions: the bridge allows emulation of the Active Monitor functions normally performed on a Token-Ring. These functions include:
Neighbor Notification
Beaconing
Token Claiming
Ring Purge
Duplicate Address Test Operation of the switching function of the bridge depends on type and destination of frames transmitted by the attached workstations. Frames type can be:

LLC frames
MAC frames Whereas, frames can be destined to:
a specific Destination MAC Address
a multiple Destination MAC Address:
  Functional address
  Broadcast
  Group address
an address of a MAC residing on another segment reached via another bridge.

Due to their specific actions on the media, MAC frames have to be handled differently depending on their type. They are identified by:
  Frame Type bits (bits 0 and 1 of Frame Control field) = B'00'

SPECIFIC DESTINATION ADDRESS MAC FRAMES

These frames are the MAC frames which are addressed to a particular destination workstation:

| Mnemonic | From/To | |
|---|---|---|
| RS | STA STA' | Response |
| TF | CRS STA | Transmit Forward |
| RRS | CRS STA | Remove Ring workstation |
| CP | CRS STA | Change Parameters |
| IRS | RPS STA | Initialize Ring workstation |
| RQAD | CRS STA | Request Ring workstation Address |
| RQS | CRS STA | Request Ring workstation State |
| RQAT | CRS STA | Request Ring workstation Attachments |
| RPAD | STA CRS | Report Ring workstation Address |
| RPS | STA CRS | Report Ring workstation State |
| RPAT | STA CRS | Report Ring workstation Attachments |

These MAC frames are handled by the bridge switch in switch mode, in the same way as LLC frames (see below). They are deposited in the FIQ of source port and switched to the FOQ of the destination port.

RING MODE MAC FRAMES

These flames are MAC frames which are addressed to all workstations on the ring, but do not depend on token capture for being transmitted and provide media control functions which must be applied on the physical ring. These functions are related to initialization or recovery of the media, so that they are essentially disruptive with respect to the traffic running between workstations. The Ring Mode MAC frames are listed below:

| Mnemonic | From/To | |
|---|---|---|
| BC | STA ALL | Beacon |
| CT | STA ALL | Claim Token |
| RP | STA ALL | Ring Purge |

BEACON MAC FRAME

This frame is processed in a different way than for plain Token-Ring, because of the star structure allowing the bridge to handle error situations more easily than in the ring structure: here, the bridge is able to point to a failing attachment and thus does not need the fault domain determination process. Upon reception of a Beacon MAC frame from a workstation, the bridge initiates a self-test procedure on the corresponding port to check if the error is caused by the bridge port.

CLAIM TOKEN MAC FRAME

This frame is issued by the Standby Monitor (attached workstation), in case of:
  signal loss;
  T(good_token) time out;
  T(receive_notification) time out.

These are error cases which are handled as such by the bridge (similar to Beacon MAC frame case).

RING PURGE MAC FRAME

This MAC frame is issued only by the Active Monitor (the bridge, in one embodiment). Consequently, if the bridge receives such a frame on a port, it is considered as an error case and handled as such.

RING POLL MAC FRAMES

These MAC frames are used to poll the ring for checking its availability and for providing the 'Neighbor Notification' function. They are listed below:

| Mnemonic | From/To | |
|---|---|---|
| AMP | STA ALL | Active Monitor Present |
| SMP | STA ALL | Standby Monitor Present |

When being defined as the Active Monitor, the bridge sends periodically (T(neighbor_notification)=7 seconds) an Active Monitor MAC frame to each port having a workstation attached.

In turn, each workstation responds with a Standby Monitor Present MAC frame. The bridge uses this frame to learn and maintain the MAC address of the workstation attached to each port.

Operations are evenly distributed among all ports of the bridge. As an example, if the bridge holds 96 ports, it will scan the ports at a 70 ms rate (<7/96) to send an Active Monitor Present MAC frame.

Process is exemplified hereafter:
  At T(neighbor_notification) time-out, the bridge enqueues an Active Monitor Present MAC frame in the FOQ of port N. This frame has no particular attribute and must wait for end of transmission of already queued frames, if any;
  The bridge waits for the token to be issued by workstation N;
  The TRP N captures the token and sends the MAC frame to the station;
  The frame is copied and repeated by workstation N and stripped by the TRP;
  After reception of the MAC frame, workstation N waits T(notification_response: 20 ms) to issue a Standby Monitor Present MAC frame. Workstation N captures the token from the bridge and sends the Standby Monitor Present MAC frame (S) to the bridge.
  TRP N repeats the frame, and copies by enqueuing the frame in FIQ N. The frame is repeated with the A and C fields set to 1 (anticipated delivery).
  The returned frame is stripped by workstation N.
  The bridge dequeues the Standby Monitor Present MAC frame from FIQ N. The fact that, its A and C bits are reset to 0 confirms that the attached workstation is the originator of the frame. Then, the bridge can associate the workstation address (SA field) to the port where the frame appeared (address learning).

An alternate ring poll handling can be envisaged to keep configuration consistency for the LAN manager (avoid having all workstations with the same NAUN). It makes the bridge send Active Monitor Present MAC frames to the first connected port, and send Standby Monitor Present MAC frames to other connected ports, these frames being sent with their SA field containing the MAC address of the previous connected port.

DUPLICATE ADDRESS TEST MAC FRAME

This particular frame is used during Phase 0 (Lobe Test) and Phase 2 (Duplicate Address Check) of workstation insertion procedure. The frame is:

| Mnemonic | From/To | |
|---|---|---|
| DAT | STA STA | Duplicate Address Test |

During Phase 0, this frame is not seen by the bridge since a workstation has not yet applied the phantom current to attach itself to the ring. Then, the frame stays on the workstation's lobe and is not handled by the bridge. During Phase 2, the frame is handled by the bridge under a specific process:
- A workstation S having a Duplicate Address Test frame to send waits for a token from the bridge port;
- Workstation S captures the token given by the bridge and sends the frame;
- The frame is enqueued in the FIQ of port S of the bridge;
- Station S issues a new token
    - at the end of transmission of the frame, or
    - upon reception of the physical header of its frame back from the bridge (which ever occurs first);
- The bridge recognizes the Duplicate Address Test MAC frame (Major Vector=07);
- If, in the bridge, there is another workstation with same address as S, then the frame is repeated by the bridge port to workstation S, with A bit ('Address recognized') set to 1 and C bit ('Copied frame') set to 1;
- If, in the bridge, there is no other workstation with same address as S, then the frame is repeated by the bridge port to workstation S, With A bit ('Address recognized') reset to 0 and C bit ('Copied frame') reset to 0;
- The frame is flushed from the FIQ of port S;

FUNCTIONAL DESTINATION ADDRESS MAC FRAMES

These MAC frames are sent to standard Token-Ring functions specified by their 'functional addresses':
X'C000 0000 0002' RPS (Ring Parameter Server)
X'C000 0000 0008' REM (Ring Error Monitor)
X'COO0 0000 0010' CPS (Configuration Parameter Server)
These frames are listed below:

| Mnemonic | From/To | |
|---|---|---|
| RQI | STA RPS | Request Initialization |
| RNAM | STA CRS | Report New Active Monitor |
| RNC | STA CRS | Report NAUN Change |
| RNNI | STA REM | Report Neighbor Notification Incomplete |
| RAME | STA REM | Report Active Monitor Error |
| RSE | STA REM | Report Soft Error |

-continued

| Mnemonic | From/To | |
|---|---|---|
| RTF | STA CRS | Report Transmit Forward |

Each of these flames is transmitted in broadcast mode: it is broadcasted to all ports, excluding the port where the frame was originated.

The frame is always returned to the source with A and C bits reset to 0, independently of the success of transmission.

LLC FRAMES

LLC frames are frames transporting the user traffic between workstations. These frames are identified by:
Frame Type bits (bits 0 and 1 of Frame Control field)=B'01'
LLC frames can be sent to a given 'specific' destination address or to a 'multiple' (group or functional) destination address.

LLC FRAMES WITH SPECIFIC DESTINATION ADDRESS

These LLC frames are transmitted in switch mode. Basically, the frames to be sent from workstation S to workstation D are enqueued in FIQ S, routed to FOQ D, and dequeued from FOQ D to be transmitted to workstation D.

Process is detailed hereafter:
- A workstation S having a frame to send to workstation D waits for a token from the bridge port;
- Station S captures the token given by the bridge and sends the frame destined to D;
- The frame is enqueued in the FIQ of port S of the bridge;
- The frame is repeated by the bridge port to workstation S, with A bit ('Address recognized') set to 1 and C bit ('Copied frame') set to 1 (Note that the bridge anticipates on the delivery of the frame);
- Station S issues a new token
    - at the end of transmission of the frame, or
    - at reception of the physical header of its frame back from the bridge (which ever occurs first);
- The bridge switch uses the DA field of the frame to determine its destination, then:
    - if destination D is on same bridge, the frame is enqueued in the FOQ of port D of the bridge,
    - if destination D is not on same bridge, the frame is enqueued in the FOQ of a BackPlane Port (BPP) detailed below;
- The destination port (TRP D) waits for a token from the attached workstation D, and captures it;
- When the destination port has captured the token, it sends the queued frame;
- Station D copies the frame and repeats it with A bit ('Address recognized') set to 1 and C bit ('Copied frame') set to 1;
- The destination port strips the frame and issues a new token (Early Token Release mode in bridge).

LLC FRAMES WITH MULTIPLE DESTINATION ADDRESS

These LLC frames are transmitted in broadcast mode. Such frames issued by a workstation S are dequeued from FIQ S, repeated to the source workstation with A and C fields set to 1 (anticipated delivery), and successively enqueued in all FOQs, except the FOQ whose associated MAC address is equal to the SA field of the frame.

Now will be described the handling of MAC addresses in the segment: a distributed implementation is assumed that all concentration cards implement a switching function which routes frames between its own ports or between one of its own ports to a port of another concentration card (via bridge backplane bus).

Each blade (as explained below) in the bridge then holds a MAC Address Table (MAT) specifying the MAC addresses of workstations attached to each active port of the blade ('local' MAC Addresses). Lines 'MAC Address TRP 1' to 'MAC Address TRP N' in such a MAT-then refer to addresses of workstations attached to Token-Ring Ports 1 to N of a blade.

MAC addresses are learned by the bridge with the help of Standby Monitor Present MAC frames sent by the attached workstations. This sets the MAC address in the corresponding entry of the table.

Disconnection of a workstation is detected by the bridge based on the removal of the phantom current. The MATs are updated accordingly.

Now, the following timers are maintained by the Active Monitor (for example in the bridge):

T(any_token)
T(claim_token)
T(escape)
T(neighbor_notification).
T(notification_response)
T(physical_trailer)
T(receive_notification)
T(ring_purge)
T(transmit_pacing)

BRIDGE INTERCONNECTION

The bridge according to the invention can be connected to another LAN segment (Token-Ring segment, EN segment, Fiber Distributed Data Interface (FDDI) backbone) thru another bridge.

As a first approach, regular bridges can be used. For example, a Token-Ring/Token-Ring bridge can provide the usual 16 Mbps between two Token-Ring segments. Such a bridge links two ports from two different token star bridges according to the invention.

A token star bridge can also be bridged to a higher speed LAN segment such as a FDDI backbone. This type of bridging is necessarily limited to 16 Mbps on the Token-Ring side as a regular Token-Ring MAC is used.

For maximizing the throughput between token star bridges, new bridges will be developed: keeping the FDDI backbone example, interconnection will be ensured via a FDDI ring. Each token star bridge attaches to the FDDI ring thru another bridge whose throughput is 100 Mbps on both the FDDI side and the token star bridge side. The token star side attachment is made onto a high bandwidth port allowing access to the aggregate throughput handled by the token star switch, as seen with respect to FIG. 2.

A regular Token Ring MAC handles only the control traffic consisting of MAC frames. The steady state traffic flowing from/to the FDDI segment is directly handled by the switch, and thus limited to the FDDI segment throughput.

PREFERRED EMBODIMENT OF THE INVENTION

Figure 3:
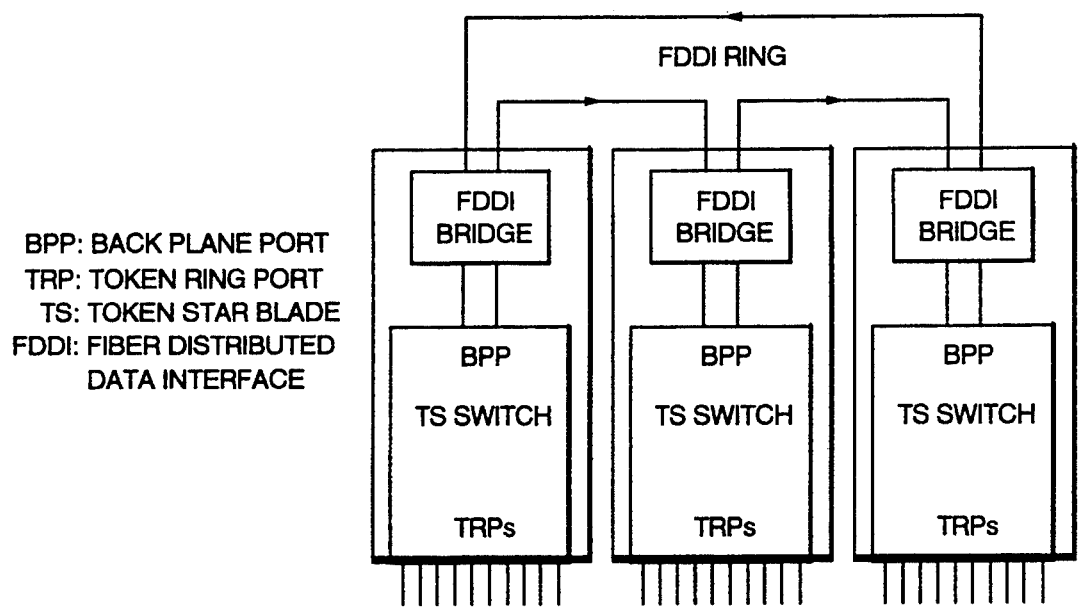
FIG. 3 is a view of a preferred embodiment of the invention.

A preferred embodiment of the invention will now be described with respect to FIG. 3. A token star bridge blade includes:

10 TRPs (10×16 Mbps);
1 BPP (1×160 Mbps).

Its characteristics are:

Balanced throughput between TRPs and BPP;
Centralized Active Monitor Processor (CAMP);
Low latency frame switching;
Guaranteed maximum frame size: 8 kBytes;
1 frame transmission per token (no intermediate frames).

As will be appreciated by the man-skilled-in-the-art, all choices such as number of TRPs, BPP throughput, frame size, etc . . . are mere examples, and are not restricting the scope of the present invention.

BPP is an interface of the switch which allows high speed transfer of TokenRing frames to an upper layer physical media. Efficient and flexible interconnections of token star blades will be made by using the BPP interfacing to an on-card FDDI bridge as shown FIG. 3, or to an Asynchronous Transfer Mode (ATM) bridge (not shown).

It will be obvious to the man-skilled-in-the-art that BPP is not a requirement for a blade always capable of handling a stand-alone Token-Ring segment.

Low latency switching characteristic expresses the ability of the token star blade to begin frame switching from FIQ to FOQ before the frame has been completely received in the FIQ, and transmission from FOQ to a workstation before the frame has been completely stored in the FOQ. This property is of particular interest for routing frames received from the BPP. It optimizes throughput on this high speed interface. It is allowed by a Data Memory Access (DMA, see below) mechanism which always guarantees a minimum instantaneous bandwidth of 16 Mbps, avoiding underrun when reading the FOQ.

The guaranteed maximum frame size is defined as the largest frame that a FIQ can receive completely. This limit appears when early switching to FOQ does not occur. Larger frames can still be handled if early switching is possible (depends on queue loads, thus cannot be guaranteed).

SWITCH

The token star bridge/blade switch is a centralized hardware performing reception, routing and transmission of frames between TRPs.

It includes the following hardware entities:
Frame Buffer
Free Buffer Supplier
Frame Switch
Receive Data Movement
Transmit Data Movement

FRAME BUFFER

The Frame Buffer is a centralized memory structure used for the switching of Token-Ring frames between all ports (TRPs as well as BPP).

Figure 4:
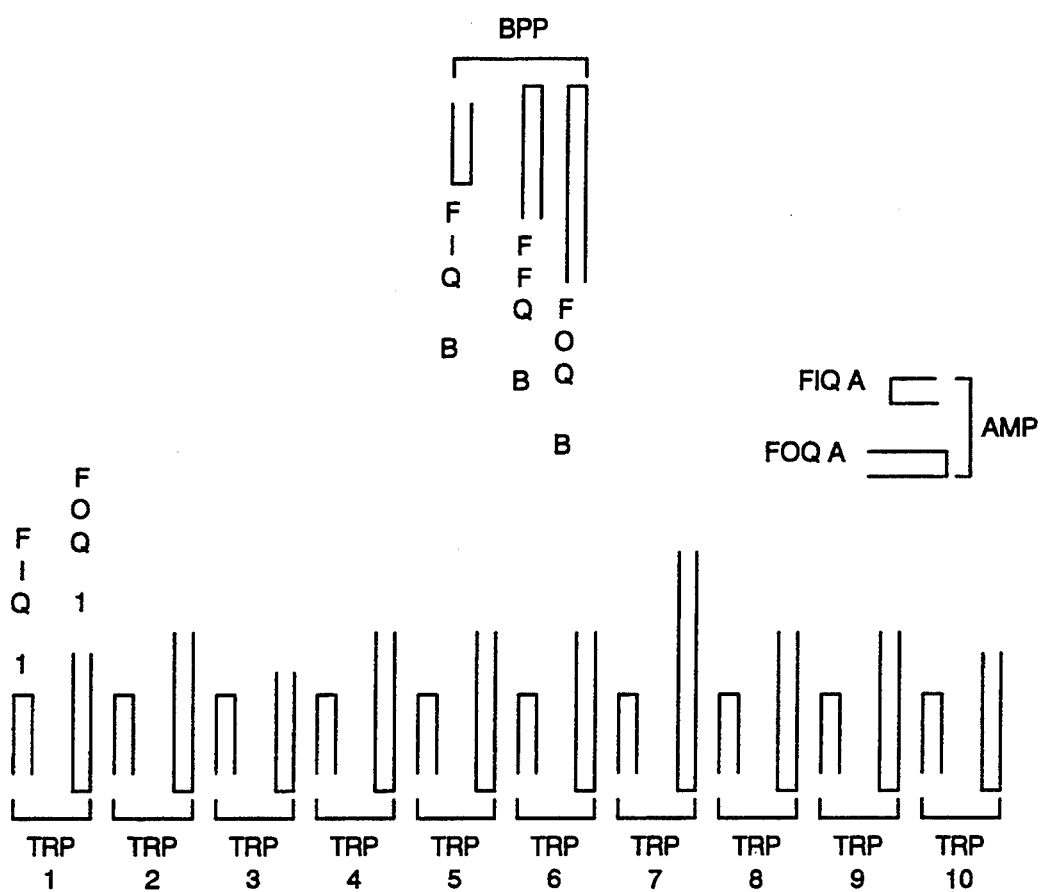
FIG. 4 is a view of logical organization of queues in the Frame Buffer.

It is logically organized as a set of queues as explained with respect to FIG. 4: input queues for traffic received from ports, output queues for traffic sent to ports.

The Frame Buffer is made of two parts:

A Data Memory (see below) which holds the actual data of frames;

A Control Block Memory (see below) which holds pointers for accessing data in the Data Memory.

Token-Ring Port: TRP

Each TRP uses the Frame Buffer thru a set of 2 queues:

FIQ N: Frame Input Queue N used to receive traffic from TRP N (N=1, ... 10);

FOQ N: Frame Output Queue N used to transmit traffic to TRP N (N=1, ... 10).

FIQs are used to receive frames from the TRPs. They must be accessed at media speed because they are the only level of reception buffer (no intermediate buffer exists between a TRP and its FIQ in Data Memory). FIQs are fixed size queues. Their role is basically to:

compact;

store only one frame at a time;

store a full Token-Ring frame.

First role is for design simplicity: this avoids to handle several frames targeting different destinations.

Second role comes from the fact that the FIQ as a first data buffer has no guarantee to be simultaneously read by the bridge switching function, since the targeted FOQ can be full. Then, as a frame reception in FIQ begins, it must be completed.

This leads to the definition of the size of the FIQs. Following Token-Ring standards would lead to 17800 bytes per FIQ. It has been chosen to restrict the service to frames limited to 8192 bytes, so that each FIQ is set to 8 kB. This keeps the Frame Buffer size in a reasonable range.

FOQs are used to transmit frames to the TRPs. They must be accessed at media speed because they are the only level of transmission buffer (no intermediate buffer exists between a TRP and its FOQ in Data Memory).

They are variable size queues: each FOQ can hold a variable amount of frames.

Maximum size of each FOQ is defined at initialization time. This allows a limited form of load balancing depending on the LAN topology: for example, if TRP 5 attaches a server while other TRPs attach workstations, it is possible to assign a wider maximum size to FOQ 5 than for other FOQs.

Active Monitor Port: AMP

The processor implementing the CAMP uses the Frame Buffer thru a set of 2 queues associated to the AMP.

FIQ A: Frame Input Queue A used to receive traffic from the AMP;

FOQ A: Frame Output Queue A used to transmit traffic to the AMP.

FIQ A is used to receive frames from the AMP. It does not have the requirement of media speed access because its data is originated by an asynchronous processor.

BackPlane Port: BPP

The BPP uses the Frame Buffer thru a set of 3 queues:

FIQ B: Frame Input Queue B used to receive traffic from the BPP;

FOQ B: Frame Output Queue B used to transmit traffic to the BPP;

FFQ B: Frame Forward Queue B used to forward traffic to the BPP.

FIQ B is used to receive flames from the BPP. It must be able to support an access throughput of 16×10=160 Mbps, but does not have the requirement of media speed access because the Backplane interface implements a flow control mechanism. Then, FIQ B access rate can be variable.

FIQ B is a fixed size queue. Its role is basically to:

compact;

store only one frame at a time;

store a full Token-Ring frame.

First role is for design simplicity: this avoids to handle several flames targeting different destinations.

Second role comes from the fact that FIQ B, as a first data buffer, has no guarantee to be simultaneously read by the bridge switching function, since the targeted FOQ can be full. Then, as a frame reception in FIQ B begins, it must be completed.

This leads to the definition of the size of FIQ B, which is set to 8 kB identical to TRP FIQs.

FOQ B is used to transmit frames from TRP FIQs or FIQ A to the BPP. It does not have the requirement of media speed access because the Backplane interface implements a flow control mechanism. Then, FOQ B access rate can be variable.

FOQ B is a variable size queue: it can hold a variable amount of frames. Maximum size of FOQ B is defined at initialization time. For example, in a configuration where all TRPs attach workstations and servers are to be accessed thru the backbone, FOQ B will be defined as a large queue since it will handle a high steady state traffic.

FFQ B is used to forward frames from FIQ B to the AMP. This is to allow simple low-end configurations where a few token star blades are connected by the backplane in a ring topology. The structure is then a ring insertion buffer. FFQ B is actually a second FOQ B, with the property of having a higher access priority than FOQ B. This is for avoiding congestion on the backplane when ring topology is used.

FFQ B does not have the requirement of media speed access because the Backplane interface implements a flow control mechanism. Then, FFQ B access rate can be variable.

FFQ B is a variable size queue: it can hold a variable amount of frames. Maximum size of the FFQ B is defined at initialization time.

FIG. 4 shows TRP FOQs of different maximum sizes. Note that the maximum size of a queue is determined by the maximum number of control blocks that the queue can use. The actual size of a queue is determined by the number of buffers used by the queue. The buffers being shared amongst all the queues, all the queues will not be able to reach simultaneously their maximum sizes.

Data Memory: DM

The DM is organized as a set of fixed size buffers. Each buffer is dynamically allocated to a port for reception or transmission of data.

Size of the buffer is set to 256 bytes, which constitutes a trade-off for supporting small frames (limited waste of memory space) and large frames (reasonable amount of buffers).

Size of the DM is set to 128 kB, leading to the average allocation of 10.6 kB per port (TRPs, BPP, AMP). This average memory space usable per port allows lows sufficient frame buffering between ports, and a total of 128 kB memory size allows easy and cost effective implementation in Static RAM.

In order to Sustain an aggregate throughput of 160 Mbps full duplex, the access bandwidth of the DM must be 320 Mbps, which is 40 MBps or 20 MHWps. To do so, the data bus width of the DM is set to 2 bytes (1 halfword).

To provide easy handling of 'violation' symbols found in Token Ring frames (Starting Delimiter and Ending Delimiter), an additional bit (VF: Violation Flag) is associated to each byte of data set to 1, this bit signalling that the associated byte is a delimiter. Contents of the byte itself determines the type of delimiter (SD or ED) and the value of the Ending Delimiter fields (I and E bits). J and K symbols are respectively encoded as 1 and 0 bits.

DM read and write accesses must be shared between:
the 10 TRPs;
the BPP;
the AMP.

For simple implementation of the read and write accesses, a sequence of Read/Write Cycles is imposed for each access: read and write accesses are used respectively to transmit and receive data to/from the TRPs.

In order to share access by all 10 TRPs, the AMP and the BPP, a recurrent sequence of 12 Read/Write Cycles is defined, each Read/Write Cycle being assigned to a given port. This gives a guaranteed access bandwidth of 16 Mbps duplex to each port.

Figure 5:
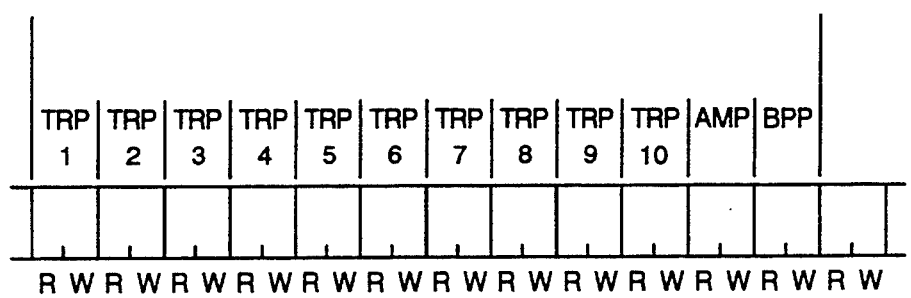
FIG. 5 shows a sequence of Read/Write Cycles in the Data Memory.

This sequence is the Read/Write Sequence as seen FIG. 5: in order to sustain media speed on each TRP, each read or write access must be able to flow 16 Mbps or 2 MBps or 1 MHWps. Then duration of the Read/Write sequence must be 1 microsecond. In turn, duration of each access window (read or write) is:

$$1000/24 = 41.66 \text{ ns.}$$

This allows the use of mid-performance SRAMs (35–40 ns cycle time) leading to a cost effective implementation.

Figure 6:
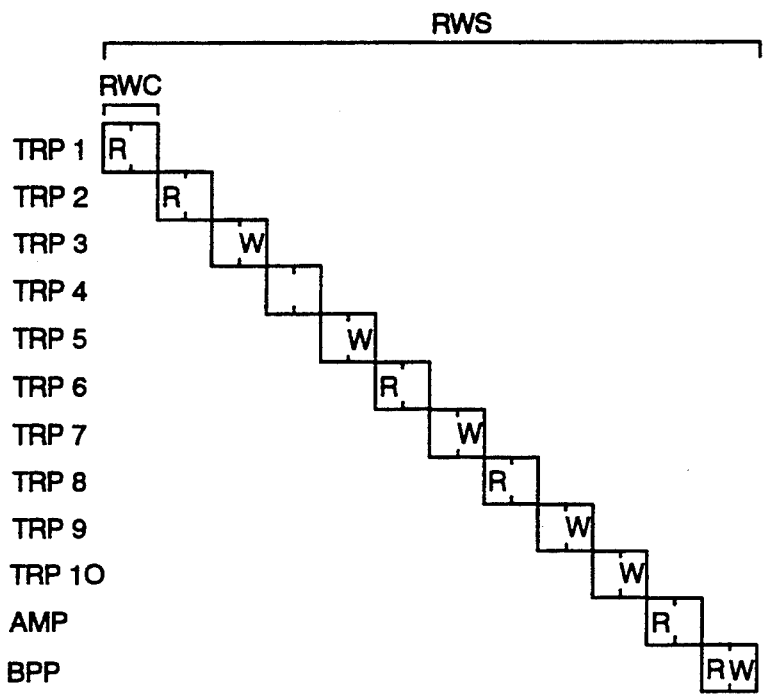
FIG. 6 shows the sequence applied to TRPs, AMP and BPP.

Due to half-duplex nature of the Token-Ring interfaces, each TRP will not simultaneously read and write in the Frame Buffer: at a given time, the TRP N will use only Read Cycles (frame transmitted to the workstation) or Write Cycles (frame received from the workstation)2 The same applies to the AMP. This situation can be represented by the table on FIG. 6.

It appears that not all Read arid/or Write Cycles are not used by TRPs and AMP. This leaves room for additional DM access by the BPP. Additional DM access by the BPP is based on the use of Read and Write Cycles not used by the TRPs and the AMP. This is possible because the Backplane interface includes a flow control mechanism which adapts the data transfer rate to the effective bandwidth of the DM access.

Figure 7:
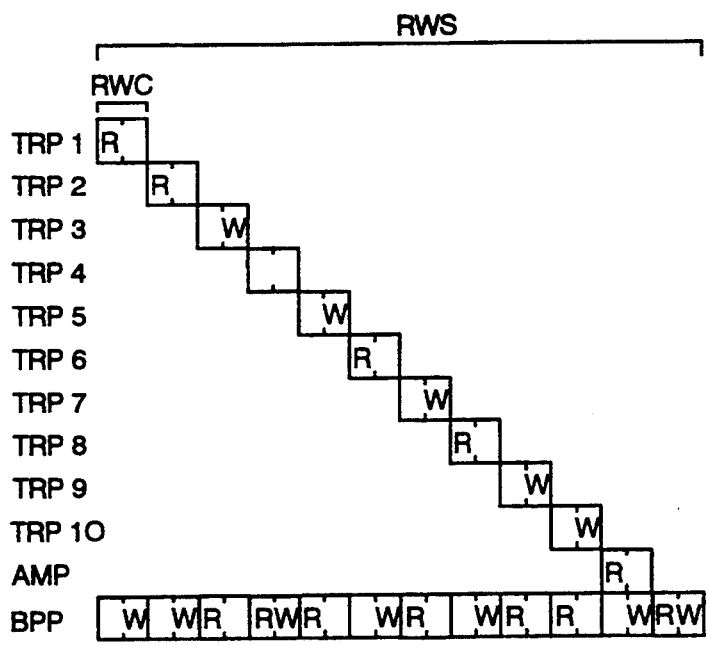
FIG. 7 shows another sequence application.

Due to the full-duplex nature of the Backplane interface (8 bits in, 8 bits out), the BPP can simultaneously use Read and Write Cycles for DM access. Keeping the same example as above, the DM access by the BPP will be represented FIG. 7.

Control Block Memory: CBM

CBM is a location where are stored:
pointers used for accessing data in the DM;
control information associated to each buffer of the DM. CBM and DM are physically separate elements for the sake of access simplicity and performance (simultaneous access of CBM for pointer handling and DM for data traffic).

Queues

Queues are implemented as lists of addresses pointing to a set of DM buffers. The DM size is 128 kB, which is 512 buffers. Then each buffer pointer is a 9-bit address.

Each FIQ has its maximum size limited to 8192 bytes; then each FIQ is implemented as a list of 1 to 32 buffer pointers (see FIG. 8).

FOQs and the FFQ B have their maximum size defined at initialization. Each of those queues can then be represented as a list of buffer pointers.

The size of each queue is defined by two CBM addresses (see FIG. 9):

FOQFA (Frame Output Queue First Address): CBM address of the first buffer pointer held by the FOQ (positions the beginning of the FOQ in the CBM space);

FOQLA (Frame Output Queue Last Address): CBM address of the last buffer pointer held by the FOQ (positions the end of the FOQ in the CBM space).

Two flags are associated with each FOQ:

FOQEF (Frame Output Queue Empty Flag): control bit indicating that the FOQ is empty (discriminates the case where Head=Tail);

FOQFF (Frame Output Queue Full Flag): Control bit indicating that the FOQ full.

These flags are not physically located in the CBM. They are part of the hardware handling data movement to/from the FOQs.

The Free Buffer Queue (FBQ, see FIG. 10) is the queue holding all buffers currently not assigned to any frame queue. At initialization, the FBQ is the list of the full set of buffers (512) physically defined in the DM. FBQ is a list of up to 512 buffer pointers.

Two flags are associated with the FBQ:

Free Buffer Queue Empty Flag (FBQEF): Control bit indicating that the the FBQ is empty (discriminates the case where Head=Tail);.

Free Buffer Queue Full Flag (FBQFF): Control bit indicating that the FBQ is full.

This latter flag should be set to 1 only at initialization time, since the Free Buffer Supplier (see below) always tries to feed free buffers from FBQ to FIQs.

Both these flags are not physically located in the CBM. They are part of the hardware handling the FBQ.

Buffer Control Blocks (BCBs) are used to associate control information to each buffer of the DM. BCBs hold three fields:

Broadcast Switch Count (BCSC): tracks the number of switching operations (from FIQ to FOQ) performed on a buffer belonging to a unicast or broadcast frame;

For unicast frames, BCSC is preset to 1 and decremented down to 0 when the buffer is dequeued from an FIQ and enqueued in an FOQ.

For broadcast frames, BCSC is preset to (1+APR: see below) and decremented down to 0 when the buffer is dequeued from an FIQ and enqueued in an FOQ. BCSC is a 4 bit field.

Active Ports Register (APR) is a 10 bit register set by the CAMP to indicate which TRPs are 'active', i.e. attaching a workstation.

BroadCast Xmit Count (BCXC): tracks the number of transmission operations (FOQ reads) performed on a buffer belonging to a unicast or broadcast frame.

For unicast frames, BCXC is preset to 1 and decremented down to 0 when the buffer is read in an FOQ.

For broadcast frames, BCXC is preset to (1+APR) and decremented down to 0 when the buffer is read in an FOQ. BCXC is a 4 bit field.

Last Buffer (LB): indicates that the associated buffer holds the last part of a frame. LB is a 1 bit field.

Logically, BCBs are represented as a linear list of 256 control blocks of 9 bits as seen FIG. 11.

CBM is to be shared by several entities:
10 TRPs (transmit or receive);
1 AMP (transmit or receive);
1 BPP (transmit and receive);
1 FSW Switch (see below).

Sharing the access to CBM is based on a time division multiplexed split of elementary read and write cycles.

Elementary cycle duration is 41.66 ns (consistent with the timing characteristics of the 8 kB SRAMs) and it can be derived from a crystal oscillator providing the 31.25 ns bit time of the Token-Ring links:

96 MHz/4=24 MHz→>41.66 ns

96 MHz/3=32 MHz→>31.25 ns

This allows to implement the bridge under a simple single-clocked design.

The same weight is given to all TRPs and AMP and to the BPP, since the BPP must sustain a traffic of same range as the aggregate traffic of the TRPs.

In order to minimize switch latency, it is important to give also a high CBM access priority to the FSW.

Thus, CBM access is equally shared between:
TRPs and AMP;
BPP;
FSW.

FREE BUFFER SUPPLIER: FBS

FBS takes care of feeding FIQs with buffers until they are 'empty', i.e. filled with free buffer pointers, and thus ready to accept the next frame.

To do so, buffer pointers are taken from the FBQ and added into the list of the FIQ.

FBS is an asynchronous mechanism which scans all FIQs of TRPs having an attached workstation (indicated by APR) and gives buffer pointers to the non-empty FIQs.

A new buffer pointer replaces an old one only when the old buffer has been completely switched, i.e. switched to one FOQ in case of unicast and switched to all requested FOQs in case of broadcast. This is tracked thru the BCSC control block which reaches 0 when complete switching has been performed.

In order to achieve fair use of buffer between 16 Mbps TRPs, low speed FIQ A and the 160 Mbps BPP, FIQ B is scanned 10 times faster than the other. FIQs.

FIQ scanning is performed under the following sequence for each queue by FBS:
Consider only non-empty FIQs (having their Empty Flag reset);
Wait for buffers available in FBQ (FBQ's Empty Flag reset);
Copy buffer pointer from FBQ head to FIQ head;
Update FIQ's head pointer;
Detect if FIQ becomes empty;
Update FBQ's head pointer;
Detect if FBQ becomes empty.

FRAME SWITCH: FSW

A Switching Request Table (SRT, see also FIG. 12) is a 12×13 matrix holding the request for frame routing from FIQs to FOQs/FFQ.

Requests are set in the SRT by the port receiving the frame in its FIQ. Request sets are masked by contents of the APR which specify which TRPs have an attached workstation.

This masking is needed for handling broadcast frames: it prevents the switching to FOQs which will never be dequeued because of absent workstation. In case of unicast, the requested destination port should never be masked, since the DA look-up process uses a table whose entries are valid only for TRPs having an attached station.

In case of unicast transmission from port I to port J, the TRP I sets the request for routing to FOQ J.

In case of broadcast transmission from port I, the TRP I sets the request for routing to all FOQs except:
FOQ I which targets the originating workstation (wraps not supported);
FOQ A which targets the CAMP;
FOQs corresponding to TRPs having no attached workstation.

In case of broadcast transmission from BPP, BPP sets a request for routing to FFQ B and all FOQs except:
FOQ B (wraps not supported);
FOQ A which targets the CAMP;
FOQs corresponding to TRPs having no attached workstation.

After a Buffer Pointer Mover (see below: BPM) has completed the switching of the frame from FIQ to FOQ, the corresponding bit of the SRT is reset.

A new request (uni- or broadcast) will be possible for FIQ I only after reset of all the request bits of SRT line I.

BUFFER POINTER MOVER: BPM

Buffer Pointer Mover BPM is a hardware function which actually performs switching of the frames by copying the buffer pointers from FIQs to FOQs.

BPM is made of 13 asynchronous units (1 per FOQ/FFQ) which operate following the contents of the corresponding column of the SRT.

For each FOQ, the process is to scan all the FIQs, and for each FIQ to:
Consider only FIQs having set a bit in the SRT;
Make a temporary copy ('P') of the head pointer of the FIQ;
Wait for available space in FOQ (FOQ not full);
Copy buffer pointer from FIQ to FOQ tail;
Update FOQ's tail pointer;
Detect if FOQ becomes full;
Decrement BCSC of moved buffer;
Update FIQ's head pointer if this was the last move of the buffer (BCSC=0);
Repeat the same process until the last buffer of the frame has been moved, in that case reset the request bit in SRT.

An additional process is performed for the FOQ A: a register MAC Frame Origin Port register is used by the BPM to indicate from which TRP the MAC frame currently in FOQ A has been received. This register is read by the CAMP to get the physical origin of the frame in the MAC address learning process (association of workstation's MAC address to its TRP).

RECEIVE DATA MOVEMENT: RDM

RDM is a piece of logic which transfers data of received frames from TRP to DM.

Next buffer pointer B is used as the high-order address for writing data. The data write
  starts at low-order address 00; and
  ends:
    at low-order address FF for intermediate buffers; or
    when the Frame Status byte (the byte following the Ending Delimiter) is reached, for last buffer.

When the destination of the frame has been determined after decode of frame type and DA field, the BCSC and BCXC control blocks are set to 1 (single destination) or 10 (broadcast).

When the last byte of the frame (Frame Status) has been written in buffer B, the Last BCB of B is set to 1.

TRANSMIT DATA MOVEMENT: XDM

XDM is a piece of logic which transfers data of frames to transmit from DM to TRP.

The next buffer pointer B is used as the high-order address for reading data. The data read
  starts at low-order address 00; and
  ends:
    at low-order address FF for intermediate buffers; or
    when the Frame Status byte (byte following the Ending Delimiter) is reached, for last buffer.

Tr is the time in the sequence of data read at which the buffer can be released to FBQ. The value of this time must be such that if the buffer is immediately supplied from FBQ to FIQ, incoming data of the FIQ will not overwrite the last data bytes which have not been read yet from the FOQ. The read rate of a TRP FOQ is 2 MBps (1 Byte/500 ns), while the write rate of the FIQ B can go up to 24 MBps (1 Byte/41.66 ns). Therefore, Tr must be after the time at which the 236th byte is read in TRP FOQ: the remaining buffer reading time is then $(256-236)*0.5=10$ us which is less than $256*41.66=10.66$ us.

In the case of FOQ B, buffer release must also occur in this last part of the read timing, since instantaneously FOQ B access can be at 2 MBps and FIQ B access at 24 MBps.

PORT INTERFACES

Each TRP of the bridge contains a Port Interface logic implementing the following functions:
  Electrical interface to the media
  Token handling
  Frame handling
    Frame reception
    Frame type detection
    Frame routing
    Frame transmission BPP contains a Port Interface logic implementing the following functions:
  Electrical interface to the media.
  Frame handling
    Frame reception
    Frame routing
    Frame transmission

TRP FUNCTIONAL DESCRIPTION

Electrical Interface

Electrical interface of the TRP is based on the physical layer of the Token-Ring.

General Flowchart

TRP operation is based on the half-duplex nature of the data movement on a workstation link:
  TRP waits for the reception of a Starting Delimiter;
  When a Starting Delimiter has been detected; the Access Control byte ('AC') of the incoming frame is analyzed to determine if it is a Token (AC(4)=1) or a Frame (AC(4)=0).

Depending on the type of incoming frame, Token handling process or Frame handling process is executed.

Token Handling Process

Token Handling process controls the Token usage by the TRP, for initiating frame transmission and allowing next frame reception:
  If the FOQ of the TRP is not empty, i.e. contains at least one complete or partial frame, the TRP starts the transmission of the frame.
  Frame transmission can start before a frame is completely enqueued in the FOQ, so that switching latency is minimized;
  If the FOQ is empty, or when the frame has been transmitted if the FOQ was not empty, the FIQ status is checked: the FIQ is 'Ready' if it has the full list of 32 buffer addresses pointing to the locations where the next frame will be received;
  When the FIQ is ready, the Token is released (sent to the station).

Frame handling process

Frame Handling process controls reception and routing of an incoming frame:
  The Source Address (SA) of the frame is compared with the MAC address of the workstation attached to the TRP (Station Address: STA);
  If SA<>STA, this frame is not originated by the attached station, but it is a frame repeated by this workstation and thus it has to be stripped by the token star;
  If SA=STA, this frame is originated by the attached workstation, and its Destination Address (DA) is compared with the workstation address.
  If DA=STA, this means that the frame is wrapped: it has been sent by the attached workstation to itself.
  It is then repeated (directly forwarded to the attached workstation) and not copied by the bridge. The A (Address Recognized) and C (Frame Copied) bits of the Frame Status field receive the value of the AC Flag. AC Flag is a hardware indicator associated to each TRP. It is set by the CAMP to indicate that the attached workstation has a duplicate MAC address, i.e. another station on the LAN has the same MAC address.
  If the attached workstation has not a duplicate MAC address, the AC Flag is reset and the frame is repeated with A=C=0 as it would be in a regular Token-Ring.
  If the attached workstation has a duplicate MAC address, the AC Flag is set and the frame is repeated with A=C=1 as it would be in a regular Token-Ring.
  If DA<>STA, this frame has to be sent to another workstation. Then, the frame is repeated to the originating workstation with its A and C bits set to 1, anticipating on frame delivery as it is done in bridges.

The frame is copied by the bridge, i.e. it is completely stored in the FIQ of the TRP;

While frame copy is performed, the frame is checked for broadcast: the DA field is compared with broadcast addresses.

If the frame is to be broadcast, it is first checked for MAC frame or LLC frame: bits 7 and 6 of the Frame Control field being both equal to 0 indicate that the frame is a MAC frame.

If it is a MAC frame, then the FOQ A is requested as a single target in the SRT. This is done by letting the TRP set a 1 in the column A of its line in the SRT. This will cause the 'Ring Mode', 'Ring Poll' and 'Duplicate Address Test' MAC frames to be sent to the CAMP.

If it is an LLC frame, then FOQs 1, ... 10 (except the own FOQ of the TRP) and FOQ B are requested as targets in the SRT. This is done by letting the TRP set a 1 in the columns 1 to 10 (except N if this is TRP N) and column B of its line in the SRT. This will cause broadcast of the frame to all workstations of the LAN, except to the one which originated it. This exception is required to keep unchanged the processing of broadcast frames by workstations of a token star, compared to a Token-Ring.

If the frame does not have a broadcast Destination Address, then the frame is checked for functional address: the DA field is compared with all functional addresses.

If the frame is targeting a functional address, then FOQs 1, ... 10 (except the own FOQ of the TRP) and FOQ B are requested as targets in the SRT. This is done by letting the TRP set a 1 in the columns 1 to 10 (except N if this is TRP N) of its line in the SRT.

If the frame is not targeting a functional address, this means that it is targeting a single destination. Its DA is then looked-up: it is compared to each workstation Address of the token star to determine if local or remote switching is to be performed. DA look-up returns the number of the TRP—if any—attaching the workstation whose MAC address is DA. If the token star does not have this workstation on any of its TRPs, the null value '0' is returned.

If the DA is found in the list of Station Addresses of the bridge, the DA is said to be local. In this case, local frame switching can be done: the frame will transit from FIQ to FOQ of the same blade. If the DA look-up return TRP 'N', FOQ N is requested as a single target in the SRT. This is done by letting the TRP set a '1' in column N of its line in the SRT.

If the DA is not found in the list of Station Addresses of the bridge, the DA is said to be remote. In this case, remote frame switching must be done: the frame will transit from FIQ to FOQs of the TRPs attaching bridges and to the FOQ of the Backplane. Such FOQs are requested as targets in the SRT. This is done by letting the TRP set a '1' in the corresponding columns of its line in the SRT. Each TRP has a Bridge Flag (BF) indicating that it attaches a workstation (BF=0) or a bridge (BF=1). See 'Bridge support' for details.

Simultaneously, FBS is rebuilding FIQ B with new buffer pointers. When FIQ B is ready, i.e. filled with a list of 32 pointers addressing 32 free buffers, the BPP input is unlocked to allow reception of the next frame.

Bridge Support

Bridge detection by network management: the network manager is in charge of marking—via a specific network management application—each TRP attaching a bridge. The network management application then sets the corresponding BF flags. The access is thru the CAMP.

Transmission thru bridges: every frame whose Destination MAC Address is not found in the list of workstation Addresses of the token star, will be sent to the TRPs having their BF flag set and to the BPP.

BPP FUNCTIONAL DESCRIPTION

Electrical Interface

Electrical interface of the BPP is based on a full duplex 8 bit parallel bus transporting Token-Ring frames at 160 Mbps.

General Flowchart

It can be found with respect to FIG. 13.

Transmit Frame Handling

The handling can be found with respect to FIG. 14.

Receive Frame Handling

BPP input is locked as soon as the Ending Delimiter is received. This prevents. FIQ overflow. This is achieved by asserting the 'BPP In Lock' signal which is sent to the BPP Out of the previous token star blade, preventing it to send data on the high speed token star bus.

Source Address of the incoming frame is looked-up. The SA look-up returns the number of the TRP—if any—attaching the workstation whose MAC address is SA. If the token star does not have this workstation on any of its TRPs, the null value '0' is returned.

If the Source Address is found in the list of Station Addresses of the bridge, the SA is said to be local. In this case, the frame is stripped because it is a frame which had circled around all token star blades and is now back to its origin blade.

If the Source Address is not found in the list of Station Addresses of the bridge, the SA is said to be remote. In this case, the frame is copied (received in FIQ B) so that it will be subsequently switched to the right destination(s).

While frame copy is performed, the frame is checked for broadcast: the DA field is compared with broadcast addresses.

If the frame is to be broadcasted, it is first checked for MAC frame or LLC frame: bits 7 and 6 of the Frame Control field being both equal to 0 indicate that the frame is a MAC frame.

If it is a MAC frame, then the FOQ A is requested as a single target in the SRT. This is done by letting the BPP set a 1 in the column A of its line in the SRT. This will cause the 'Ring Mode', 'Ring Poll' and 'Duplicate Address Test' MAC frames to be sent to the CAMP. This case should be considered as an error condition, since these MAC frames should not appear on the high speed Token Star bus.

If it is an LLC frame, then all FOQs 1, ... 10 and FFQ B are requested as targets in the SRT. This is done by letting the BPP set a 1 in the columns 1 to 10 and column F of its line in the SRT. This will cause broadcast of the frame to all workstations of the LAN.

If the frame does not have a broadcast Destination Address, then the frame is checked for functional address: the DA field is compared with all functional addresses.

If the frame is targeting a functional address, then all FOQs 1, ... 10 and FFQ B are requested as targets in the SRT. This is done by letting the BPP set a 1 in the columns 1 to 10 and column F of its line in the SRT.

If the frame is not targeting a functional address, this means that it is targeting a single destination. Its Destination Address is then looked-up: it is compared to each workstation address of the bridge to determine if local or remote switching is to be performed. The DA look-up returns the number the TRP—if any—attaching the workstation whose MAC address is DA. If the bridge does not have this workstation on any of its TRPs, the null value '0' is returned.

If the Destination Address is found in the list of workstation addresses of the bridge, the DA is said to be local. In this case, local frame switching can be done: the frame will transit from FIQ to FOQ of the same blade. If the DA look-up return TRP 'N', the FOQ N is requested as a single target in the SRT. This is done by letting the BPP set a 1 in the column N of its line in the SRT.

If the Destination Address is not found in the list of workstation addresses of the bridge, the DA is said to be remote. In this case, remote frame switching must be done: the frame will transit from FIQ to the FOQs of the TRPs attaching bridges and to the FFQ of the Backplane. Such FOQs are requested as targets in the SRT. This is done by letting the BPP set a 1 in the corresponding columns of its line in the SRT. Each TRP has a Bridge Flag ('BF') indicating that it attaches a workstation (BF=0) or a bridge (BF=1). See '.Bridge support' for further details.

DESTINATION ADDRESS LOOK-UP

Station Address Table: SAT

The Destination Address look-up is done by scanning a SAT holding the MAC addresses of all workstations attached to the TRPs off the bridge.

There are 3 SATs:
TSAT: TRP Station Address Table used by the TRPs;
BSAT: BPP Station Address Table used by the BPP;
GSAT: Global Station Address Table used by the CAMP (see—CENTRALIZED ACTIVE MONITOR PROCESSOR below)

TSAT

All 10 TRPs share the access of the same physical TSAT. This table is managed by the CAMP thru its address learning process: the CAMP writes the MAC address of a workstation inserting the bridge, and it suppresses this address (writes a null MAC address) when the workstation is removed from the bridge. Station removal is detected via phantom current removal.

Logically, the TSAT is a 10-entry table, each entry holding the MAC address of the workstation attached to each TRP. Associated to each entry, a flag (Valid Entry Flag: VEF) indicates that the entry contains a valid workstation Address (VEF=1) or that it is empty or being changed (VEF=0). Physically, the TSAT is a 128-byte imbedded RAM accessed via a 16-bit parallel bus, in which 60 bytes (10×6) are used for holding the workstation addresses.

All 10 VEFs are accessed along with the Least Significant part of the workstation Address.

Such a physical mapping eases the addressing of the RAM since the 2 least significant address bits are used to scan the 6 bytes of a workstation address, and the 4 most significant address bits are used to select one TRP out of 10.

The least significant bytes of the workstation addresses are placed at lower TSAT addresses, so that they will be the first to be scanned in the look-up process.

Look-up process is as follows:
Compare the 2 low-order bytes of DA to low-order bytes of the first entry;
If match:
  Compare the 2 mid-order bytes of DA to mid-order bytes of the first entry;.
If match:
  Compare the 2 high-order bytes of DA to high-order bytes of the first entry;
If match:
  Report entry number and stop;
else:
  Repeat with next entry, until last entry scanned;
else:
  Repeat with next entry, until last entry scanned;
else:
  Repeat with next entry, until last entry scanned.

TSAT access

Access of the TSAT is shared thru a simple TDM scheme.

TSAT read accesses must be shared between:
the 10 TRPs
the AMP
TSAT write accesses are done only by:
the AMP

BSAT

BPP has dedicated access to the BSAT. BPP uses this table for SA look-up and DA look-up. This table is managed by the CAMP thru its address learning process: the CAMP writes the MAC address of a workstation inserting the bridge, and it suppresses this address (writes a null MAC address) when the workstation is removed from the bridge. Station removal is detected via phantom current removal.

Logically, the BSAT is a 10-entry table, each entry holding the MAC address of the workstation attached to each TRP. Associated to each entry, a flag VEF indicates that the entry contains a valid workstation Address (VEF=1) or that it is empty or being changed (VEF=0).

Physically, the BSAT is a 128-byte imbedded RAM accessed via an 16-bit parallel bus, in which 60 bytes (10×6) are used for holding the workstation addresses.

All 10 VEFs are accessed along with the Least Significant part of the workstation address. Such a physical mapping eases the addressing of the RAM since the 2 least significant address bits are used to scan the 6 bytes of a workstation address, and the 4 most significant address bits are used to select one TRP out of 10. The least significant bytes of the workstation addresses are placed at lower BSAT addresses, so that they will be the first to be scanned in the look-up process.

Look-up process is as follows:
Compare the 2 low-order bytes of SA/DA to low-order bytes of the first entry;
If match:
Compare the 2 mid-order bytes of SA/DA to mid-order bytes of the first entry;
If match:
Compare the 2 high-order bytes of SA/DA to high-order bytes of the first entry;
If match:
Report entry number and stop;
else:
Repeat with next entry, until last entry scanned;
else:
Repeat with next entry, until last entry scanned;
else:
Repeat with next entry, until last entry scanned.

BSAT Access

BSAT access is shared thru a simple TDM scheme.
BSAT read accesses must be shared between:
the BPP
the AMP
The BSAT write accesses are done only by:
the AMP

CENTRALIZED ACTIVE MONITOR PROCESSOR: CAMP

The CAMP is the microprocessor in charge of running the Active Monitor functions.

MAC FRAMES PROCESSING

The CAMP processes the following MAC frames:
Ring Mode MAC frames
Ring Poll MAC frames
Duplicate Address Test MAC frame

RING MODE MAC FRAMES

These frames are addressed to all workstations on the ring, but do not depend on token capture for being transmitted, and provide media control functions which must be applied on the physical ring.

These functions are related to initialization or recovery of the media, so that they are essentially disruptive with respect to the traffic running between workstations.

Ring Mode MAC frames are listed below:

| Hex | Mnemonic | From/To | |
|-----|----------|---------|---|
| 02  | BC       | STA ALL | Beacon |
| 03  | CT       | STA ALL | Claim Token |
| 04  | RP       | STA ALL | Ring Purge |

(all frames express buffered)

BEACON MAC FRAME

This frame is processed in a different way than for the plain Token-Ring, because cause of the star structure allowing the bridge to handle error situations more easily than in the ring structure: here, the bridge is able to point to a failing attachment and thus does not need the fault domain determination process.

Upon reception of a Beacon MAC frame from the workstation, the bridge initiates the self-test procedure on the corresponding port to check if the error is caused by the bridge port.

CLAIM TOKEN MAC FRAME

This frame is issued by the Active Monitor, i.e. the bridge, in case of:
signal loss;
T(receive_notification) time out;
no Ring Purge MAC frames back from workstation.
Standard process is applied in these cases.

The Claim Token MAC frame is issued by the Standby Monitor, i.e. the attached workstation, in case of:
signal loss;
T(good_token) time out;
T(receive_notification) time out.

These are error cases which are handled as such by the bridge (similar to Beacon MAC frame case).

RING PURGE MAC FRAME

This frame is issued only by the Active Monitor, i.e. the bridge. Consequently, if the bridge receives such a frame on a port, it will be considered as an error case and handled as such.

RING POLL MAC FRAMES

These frames are used to poll the ring for checking its availability and for providing the 'Neighbor Notification' function. Ring Poll MAC frames are listed below:

| Hex | Mnemonic | From/To | |
|-----|----------|---------|---|
| 05  | AMP      | STA ALL | Active Monitor Present |
| 05  | SMP      | STA ALL | Standby Monitor Present |

(all frames express buffered)

Being defined as the Active Monitor, the bridge will send periodically (T(neighbor_notification)=7 seconds) an Active Monitor MAC frame to each port attaching a workstation.

In turn, each workstation responds with a Standby Monitor Present MAC frame. The bridge uses this frame to learn and maintain the MAC address of the workstation attached to each port.

Operations are evenly distributed among all ports of the bridge. As an example, if the bridge holds 96 ports, it will scan the ports at a 70 ms rate (<7/96) to send an Active Monitor Present MAC frame.

Process is exemplified below.
At T(neighbor_notification) time-out, the bridge enqueues an Active Monitor Present MAC frame ('A') in its FIQ A at destination of workstation N.
The frame is switched to the FOQ of port N by the Frame Switch. This frame has no particular attribute and must wait for end of transmission of already queued frames, if any.
TRP N waits for the token to be issued its attached station N;
TRP N captures the token and sends the MAC frame to the station;

The frame is copied and repeated by the workstation N and stripped the TRP;

After reception of the MAC frame, workstation N waits T(notification_response) (20 ms) to issue a Standby Monitor Present MAC frame. The workstation first needs a token from the bridge;

Workstation N captures the token and sends the Standby Monitor Present MAC frame (S) to the bridge;

TRP N repeats the frame, and copies it, i.e. enqueues the frame in FIQ N.

The frame is repeated with the A and C fields set to 1 (anticipated delivery);

The returned frame is stripped by workstation N;

The Standby Monitor Present MAC frame is switched from FIQ N to FOQ A to be given to the CAMP. The fact that its A and C bits are reset to 0 confirms that the attached workstation is the originator of the frame. Then, the CAMP can associate the workstation address (SA field) to the port where the frame appeared (address learning).

A possible alternate ring poll handling can be envisaged to keep configuration consistency for the LAN manager (avoid having all workstations with the same NAUN). It makes the bridge send Active Monitor Present MAC frames to the first connected port, and send Standby Monitor Present MAC frames to other connected ports, these frames being sent with their SA field containing the MAC address of the previous connected port.

DUPLICATE ADDRESS TEST MAC FRAME

This particular frame is used during Phase 0 (Lobe Test) and Phase 2 (Duplicate Address Check) of the workstation insertion procedure.

The Duplicate Address Test MAC frame is:

| Hex | Mnemonic | From/To | |
|-----|----------|---------|---|
| 07 | DAT | STA STA | Duplicate Address Test |

(frame express buffered)

During Phase 0, this frame is not seen by the bridge since the workstation has not yet applied the phantom current to attach itself on the ring. Then, the frame stays on the workstation's lobe and is not handled by the bridge. During Phase 2, the frame is handled by the bridge under a specific process:

A workstation S having a Duplicate Address Test frame to send wait for a token from the bridge port;

Workstation S captures the token given by the bridge and sends the frame;

The frame is enqueued in the FIQ of port S;

If workstation S runs in Early Token Release mode, station S issues a new token:
  at the end of transmission of the frame,or
  at reception of the Physical Header of its frame back from the bridge (which ever occurs first);

If workstation S does not run in Early Token Release mode, workstation S issues a new token at reception of the Physical Header of its frame back from the bridge port;

The bridge recognizes the Duplicate Address Test MAC frame (Major Vector=07);

If, in the bridge, there is another workstation with same address as S, then the frame is repeated by the bridge port to workstation S, with A bit ('Address recognized') set to 1 and C bit ('Copied frame') set to 1;

If, in the bridge, there is no other workstation with same address as S, then the frame is repeated by the bridge port to workstation S, with A bit ('Address recognized') reset to 0 and C bit ('Copied frame') reset to 0;

The frame is flushed from FIQ of port S:

This operation mode supports the case where several workstations issue a 'Duplicate Address Test' MAC frame. In this case, the bridge processes completely each of these frames at a time.

MAC ADDRESS LEARNING

Workstation Insertion

The scenario given below is followed by a workstation inserting into a token star segment. Due to the particular structure of the token star bridge, when Active Monitor, there are few situations to handle.

Phase 0: Lobe Testing
  Lobe Test
  Duplicate Address Test
Phase 1: Monitor Check
  Active Monitor Present received
  Standby Monitor Present issued
Phase 2: Duplicate Address Check
Phase 3: Neighbor Notification Participation
  New Standby Monitor
  Active Monitor Present issued by AM
  Standby Monitor Present issued
Phase 4: Request Initialization
  Request Initialization sent to RPS
  Initialize Ring workstation sent by RPS
  Response sent to RPS

Global Station Address Table: GSAT

The Destination Address look-up is done by scanning a SAT holding MAC addresses of all workstations attached to the TRPs of the bridge.

There are 3 SATs:
  TSAT: TRP workstation Address Table used by the TRPs
  BSAT: BPP workstation Address Table used by the BPP (see .Station Address Table);
  GSAT: Global Station Address Table used by the CAMP.

GSAT (as seen FIG. 15) is more complete than TSAT and BSAT in that it contains the MAC addresses of all the workstations of the token star bridge, and not only of one token star blade.

Logically, the GSAT is split in 16 areas, each area containing the MAC addresses of the workstations attached to each of the 16 blades that a token star bridge can contain (16 is the maximum number of blades that can be plugged in the chassis of the ATM switched bridge, as an example).

Each area of the GSAT is a 10-entry table, each entry holding the MAC address of the workstation attached to each TRP of the blade.

Physically, the GSAT is a 960-byte array located in the RAM memory space of the CAMP. It is accessed by the 16-bit data bus.

The GSAT begins at GSAT Start Address (GSSA) in the CAMP's memory space.

The CAMP also accesses the BSAT and the TSAT for updating it with the same contents than the current blade's area of the GSAT.

We claim:

1. A bridge having n ports (n being an integer > 1), each port being connected to a different one of a plurality of Token-Ring physical segments, each physical segment having at least one native Token-Ring workstation attached, said bridge being characterized in that it comprises means for emulating to the workstations a single Token-Ring logical segment with a single Active Monitor and a single Ring Number representing all of the physical ring segments, wherein the active monitor detects errors on the physical ring segments and initiates error recovery actions.

2. The bridge according to claim 1, characterized in that the means for emulating include means for defining the bridge as the Active Monitor by providing a same MAC (Medium Access Control) address in all Active Monitor Present MAC frames sent to the workstations.

3. The bridge according to claim 1 or 2, characterized in that it comprises, upon receipt of a frame sent by any of the workstations:
   means for handling said frame, said handling means comprising:
      means for switching a Single Destination LLC (Logical Link Control) or MAC frame to any of the n ports and attached workstations,
      means for broadcasting a Functional destination Address LLC or MAC frame to all ports and attached workstations, other than the port on which the frame is reviewed,
   means for processing independently at each port a Token-Ring Duplicate Address Test MAC frame,
   means for propagating a Neighbor Notification MAC frame to the next port and attached workstation, in sequence on the bridge relative to a port on which the form was received, and
   means for delaying releasing of a Token to said any of the workstations, until a received frame has been handled.

4. The bridge according to claim 1 or claim 2, characterized in that it further comprises means for mastering at each port the physical clock provided to attached workstations.

5. The bridge according to claim 3, characterized in that it comprises means for associating each port with the MAC Address of workstations attached to that port.

6. The bridge according to claim 5, characterized in that the means for processing independently at each port a Duplicate Address Test MAC frame, comprises means for using the associating means to determine whether an inserting workstation has a MAC Address already known to the bridge.

* * * * *